(12) United States Patent
Yamagishi et al.

(10) Patent No.: US 10,154,252 B2
(45) Date of Patent: Dec. 11, 2018

(54) PROJECTION-TYPE IMAGE DISPLAY APPARATUS

(71) Applicant: PANASONIC INTELLECTUAL PROPERTY MANAGEMENT CO., LTD., Osaka (JP)

(72) Inventors: Shigekazu Yamagishi, Osaka (JP); Michihiro Okuda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 117 days.

(21) Appl. No.: 15/284,276

(22) Filed: Oct. 3, 2016

(65) Prior Publication Data

US 2017/0104984 A1    Apr. 13, 2017

(30) Foreign Application Priority Data

Oct. 8, 2015   (JP) ................. 2015-199838

(51) Int. Cl.

| H04N 9/31 | (2006.01) |
|---|---|
| H04N 13/31 | (2018.01) |
| H04N 13/32 | (2018.01) |
| H04N 13/334 | (2018.01) |
| H04N 13/337 | (2018.01) |

(Continued)

(52) U.S. Cl.
CPC ........... *H04N 13/31* (2018.05); *H04N 9/3102* (2013.01); *H04N 9/3111* (2013.01); *H04N 9/3155* (2013.01); *H04N 9/3161* (2013.01); *H04N 9/3164* (2013.01); *H04N 9/3167* (2013.01); *H04N 9/3188* (2013.01); *H04N 13/32* (2018.05); *H04N 13/334* (2018.05); *H04N 13/337* (2018.05); *H04N 13/363* (2018.05); *H04N 13/365* (2018.05); *H04N 13/398* (2018.05); *H04N 2213/001* (2013.01)

(58) Field of Classification Search
CPC ................ G02B 27/101; G02B 5/3016; G02B 2027/194; G02B 2027/0114
USPC ....................................... 348/36–61
See application file for complete search history.

(56) References Cited

U.S. PATENT DOCUMENTS

| 2008/0158512 A1 | 7/2008 | Mizushima et al. |
| 2016/0209652 A1* | 7/2016 | Ichihashi ................. G02B 5/26 |

FOREIGN PATENT DOCUMENTS

| JP | 5090900 B2 | 12/2012 |
| JP | 2013-120328 A | 6/2013 |

(Continued)

*Primary Examiner* — Anand S Rao
(74) *Attorney, Agent, or Firm* — McDermott Will & Emery LLP

(57) ABSTRACT

A projection-type image display apparatus of the present disclosure includes a fluorescent substance, a blue-color laser diode excitation optical system, a DMD, a projection optical system, a polarizing plate, and a depolarizing plate. The fluorescent substance has characteristics of emitting predetermined fluorescence in response to excitation light. The blue-color laser diode has a semiconductor laser that emits laser light of a wavelength with which the fluorescent substance is excited. The excitation optical system condenses light from the blue-color laser diode. The DMD is controllable by a signal from an external source. The projection optical system is an optical system that can enlarge and project an image displayed by the DMD. The polarizing plate is disposed on the output side of the projection optical system.

19 Claims, 15 Drawing Sheets

(51) Int. Cl.
*H04N 13/363* (2018.01)
*H04N 13/365* (2018.01)
*H04N 13/398* (2018.01)

(56) References Cited

FOREIGN PATENT DOCUMENTS

| | | | |
|---|---|---|---|
| JP | 2014-191248 | A | 10/2014 |
| WO | 2015/140980 | A1 | 9/2015 |

* cited by examiner

PROJECTION-TYPE IMAGE DISPLAY APPARATUS

RELATED APPLICATIONS

This application claims the benefit of Japanese Application No. 2015-199838, filed on Oct. 8, 2015, the disclosure of which Application is incorporated by reference herein.

BACKGROUND

1. Field

The present disclosure relates to a projection-type image display apparatus that is used for, for example, projecting a stereoscopic image using polarization.

2. Description of the Related Art

There are mainly the following three schemes for realizing a stereoscopic image. 1) A right eye-image signal and a left eye-image signal provided with parallax are respectively input to separate projection-type image display apparatuses. Images projected from respective projection-type image display apparatuses are guided to just the corresponding right or left eye using a dedicated eyewear. 2) A right eye-image and a left eye-image provided with parallax are projected while being switched at high speeds, and the images are guided to just the corresponding right or left eye using an eyewear having a high-speed shutter synchronized with the images. 3) The primary colors of an image signal are projected with waveforms being out of phase between a right eye-image and a left eye-image. For example, the right eye-image is projected while being shifted toward the short wavelength side, and the left eye-image is projected while being shifted toward the long wavelength side. By allowing the image projected by the projection-type image display apparatus to pass through an eyewear that transmits just short wavelengths, just the right eye-image can be guided to the right eye. The left-eye image is guided to the left eye in the same manner.

While these schemes each have advantages and disadvantages, particularly the scheme 1) is now the most widespread scheme for viewing with a large number of viewers because of the inexpensiveness of the eyewear, which is therefore disposable and advantageous for hygienic reasons. Unexamined Japanese Patent Publication No. 2013-120328 discloses a system employing a projection-type image display apparatus based on such a polarization eyewear scheme.

SUMMARY

A projection-type image display apparatus of the present disclosure includes a fluorescent substance, an excitation light source apparatus, an excitation optical system, an image display element, a projection optical system, a polarizing plate, and a depolarizing plate. The fluorescent substance has characteristics of emitting predetermined fluorescence in response to excitation light. The excitation light source apparatus has a semiconductor laser that emits laser light of a wavelength with which the fluorescent substance is excited. The excitation optical system condenses the light from the excitation light source apparatus. The image display element is controllable by a signal from an external source. The projection optical system is an optical system capable of enlarging and projecting an image displayed by the image display element. The polarizing plate is disposed on an output side of the projection optical system.

The projection-type image display apparatus of the present disclosure is effective in implementing a stereoscopic image system of high image quality in a projection-type image display apparatus using a solid-state light source of high-brightness output.

DETAILED DESCRIPTION

In the following, with reference to the drawings as appropriate, a detailed description will be given of an exemplary embodiment. Note that, an excessively detailed description may be omitted. For example, a detailed description of a well-known matter or a repetitive description of substantially identical structures may be omitted. This is to avoid unnecessary redundancy in the following description, and to facilitate understanding of a person skilled in the art.

Note that, the accompanying drawings and the following description are provided for a person skilled in the art to fully understand the present disclosure, and they are not intended to limit the subject disclosed in the scope of claims.

Conventionally, a high pressure mercury lamp has been used as the light source of a projection-type image display apparatus (a projector). However, in recent years, a solid-state light source has been used as the light source of a projection-type image display apparatus. A solid-state light source is advantageous in its long life, capability of instantly being turned-on, and being in no need of mercury. In a projection-type image display apparatus which require particularly high brightness for the purpose of presenting images to a large number of viewers, a blue-color semiconductor laser is used as a solid-state light source. Blue color is projected using blue-color laser light from the blue-color semiconductor laser. Green color and red color are each projected using light emitted by a fluorescent substance in response to irradiation with blue-color laser light as excitation light.

A projection-type image display apparatus according to the present exemplary embodiment employs the scheme of realizing stereoscopy with an eyewear provided with polarizing filters. Right and left image signals provided with parallax are input from an external signal source to the projection-type image display apparatus. The projection-type image display apparatus projects, using two projectors, a "right-eye image" from one of the projectors and a "left-eye image" from the other projector simultaneously on a screen. The right and left images projected on the screen are seen as being displaced from each other on the screen as they are, and not seen stereoscopically. Here, a special polarizing filter (circular polarization, vertical and horizontal polarization or the like) is attached in front of the lens of each of the two projectors. Further, the viewer wears a dedicated eyewear equipped with polarizing filters respectively corresponding to the right-eye side and the left-eye side. Thus, the viewer sees only the right-eye image with the right eye and only the left-eye image with the left eye, whereby stereoscopy is realized. Each polarizing filter is made of a polarizing plate, or a polarizing plate and a circular polarizing plate provided on the output side of the polarizing plate.

Figure 1:
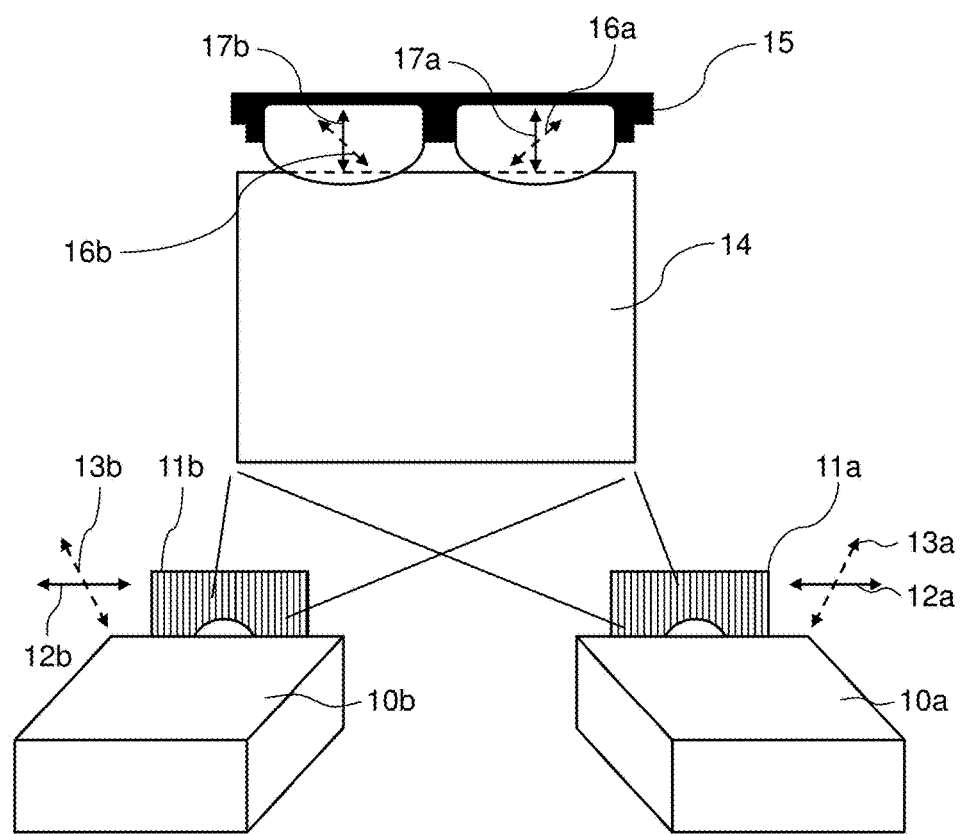
FIG. 1 is a diagram showing the structure of a stereoscopic image system using polarization.

With reference to FIG. 1, a description will be given of the structure of a stereoscopic image system using polarization. Projection-type image display apparatus 10a projects an image corresponding to a right-eye image signal and projection-type image display apparatus 10b projects an image corresponding to a left-eye image signal. Near the output sections of respective projection-type image display apparatuses, retardation plate-equipped polarizing plates 11a, 11b each equipped with a quarter-wave retardation plate on the output side are respectively disposed. As shown in FIG. 1, in retardation plate-equipped polarizing plates 11a, 11b, the polarizing plates are provided so that their respective absorption axes 12a, 12b are oriented in an identical direction. The quarter-wave retardation plates of retardation plate-equipped polarizing plates 11a, 11b are provided so that an angle of 45 degrees is formed between slow axes 13a, 13b and absorption axes 12a, 12b of the polarizing plates, in order to provide circularly polarized output light. The quarter-wave retardation plates have their respective slow axes 13a, 13b inclined in opposite directions as shown in FIG. 1, in order to provide light beams which are circularly polarized in opposite directions between retardation plate-equipped polarizing plates 11a, 11b. Thus, light beams having passed through retardation plate-equipped polarizing plates 11a, 11b are provided as circularly polarized light beams which are opposite from each other in rotation direction.

The projection light beams are projected on screen 14, which maintains the polarization characteristics, so as to be overlaid on each other. Rotation directions of polarization characteristics of the input light beams are reversed when the light beams are reflected on the screen surface.

The viewer wears eyewear 15 for viewing. Eyewear 15 has quarter-wave retardation plates and polarizing plates. For example, projection-type image display apparatus 10a that projects an image corresponding to a right eye-image signal projects circularly polarized light of counterclockwise rotation from retardation plate-equipped polarizing plate 11a equipped with a quarter-wave retardation plate. The circularly polarized light of counterclockwise rotation is reflected by screen 14 and returns as circularly polarized light of clockwise rotation. This circularly polarized light of clockwise rotation becomes light having polarization characteristics being orthogonal to the projection light, by the quarter-wave retardation plate (slow axis 16a is disposed as shown in FIG. 1) disposed in the right eye-optical path of eyewear 15, and input to the polarizing plate. Since the absorption axis of the polarizing plate disposed in the right eye-optical path of eyewear 15 is set in the direction orthogonal to the projection side, the light transmits through the polarizing plate disposed in the right eye-optical path of eyewear 15. Accordingly, the light is visible with the right eye. On the other hand, the quarter-wave retardation plate disposed in the left eye-optical path of eyewear 15 has the characteristics being opposite to that of the quarter-wave retardation plate disposed in the right eye-optical path, and the light having the polarization characteristics being in parallel to the projection light is input to the polarizing plate of eyewear 15. Since this light is blocked by the polarizing plate of eyewear 15, it is not visible with the left eye. The same holds true for projection-type image display apparatus 10b that projects an image corresponding to the left eye-image signal. Thus, the viewer can watch a stereoscopic image.

One exemplary embodiment of the present disclosure is the structure in which a polarizing plate is added on the output side of a projection-type image display apparatus. In the following exemplary embodiment, a description will be given of such a structure.

(Exemplary Embodiment)

In the following, with reference to FIGS. 1 to 8, a description will be given of an exemplary embodiment of an illumination apparatus using a solid-state light source.

Figure 2:
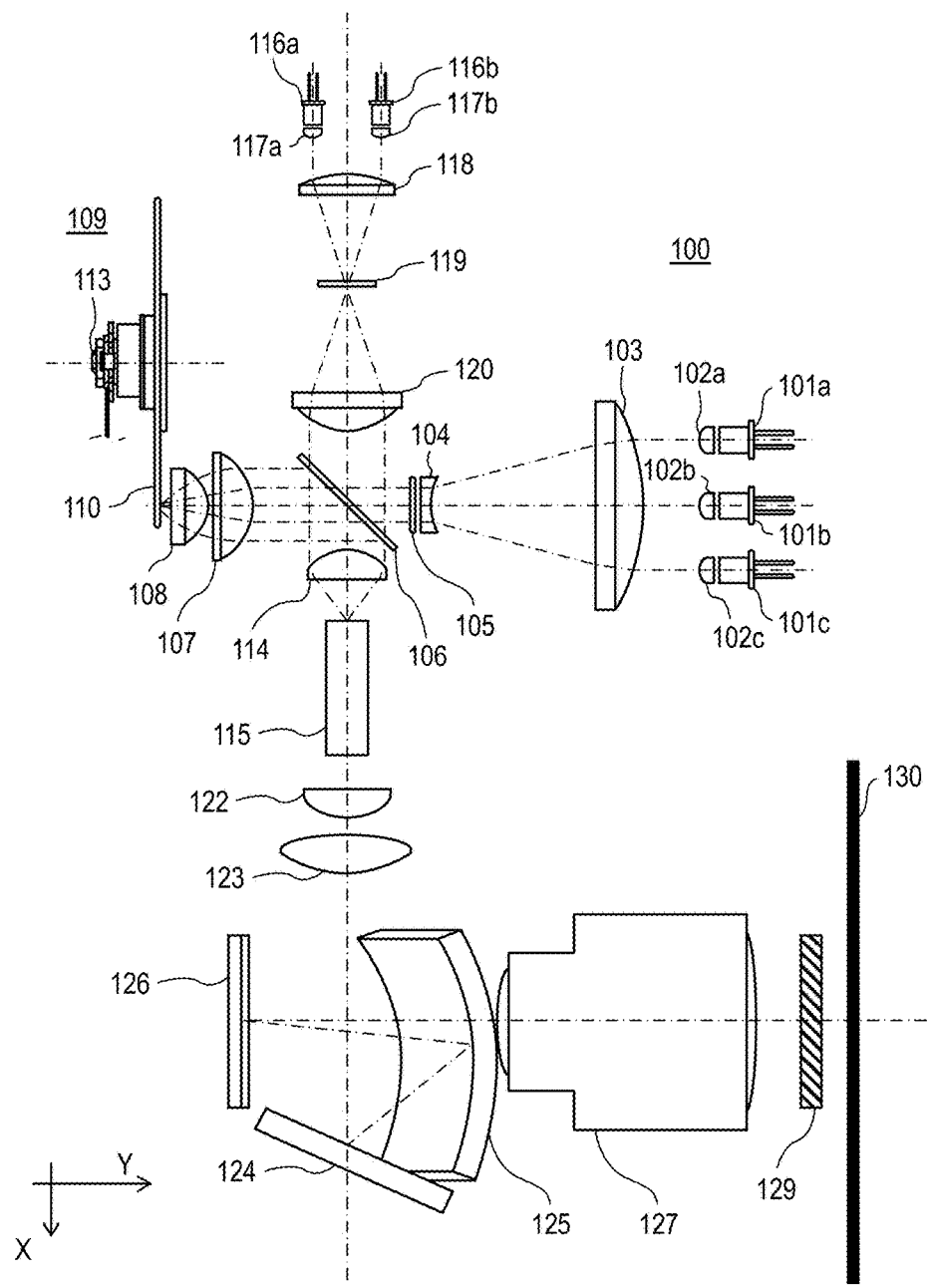
FIG. 2 is a diagram showing the structure of a stereoscopic image projection-type display apparatus using polarization according to an exemplary embodiment.
Figure 3:
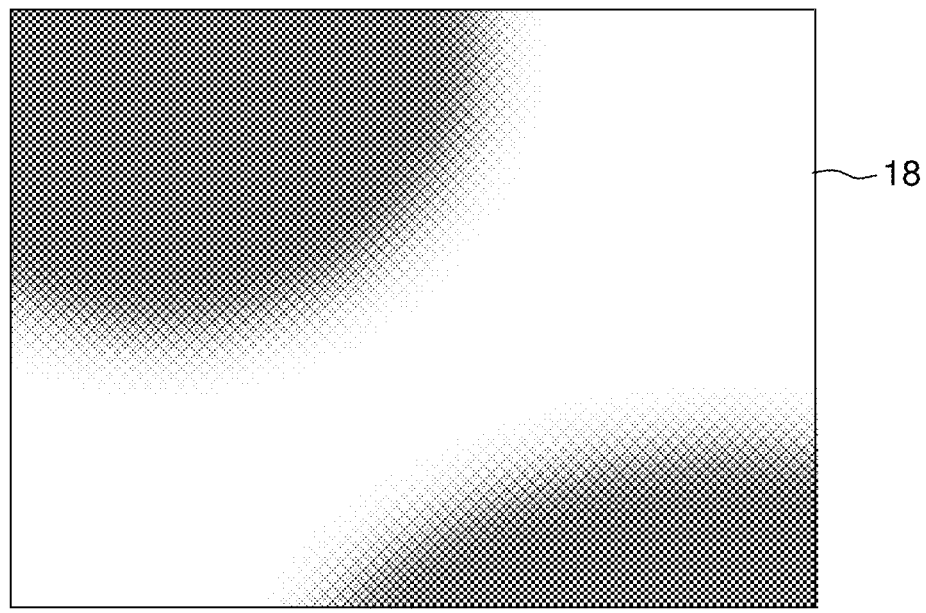
FIG. 3 is a diagram describing the state where color variations occur in a projected image.
Figure 4:
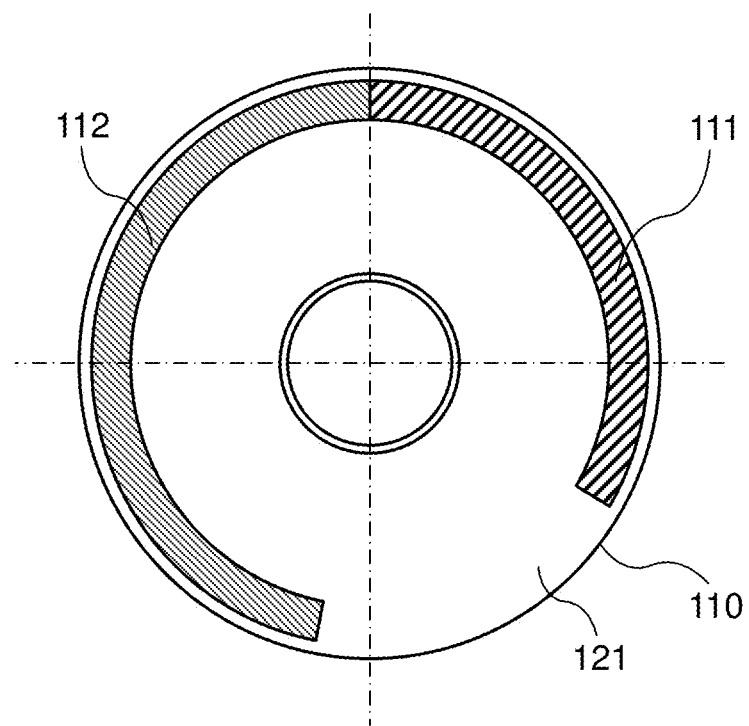
FIG. 4 is a front view of a fluorescent substance wheel apparatus.
Figure 5:
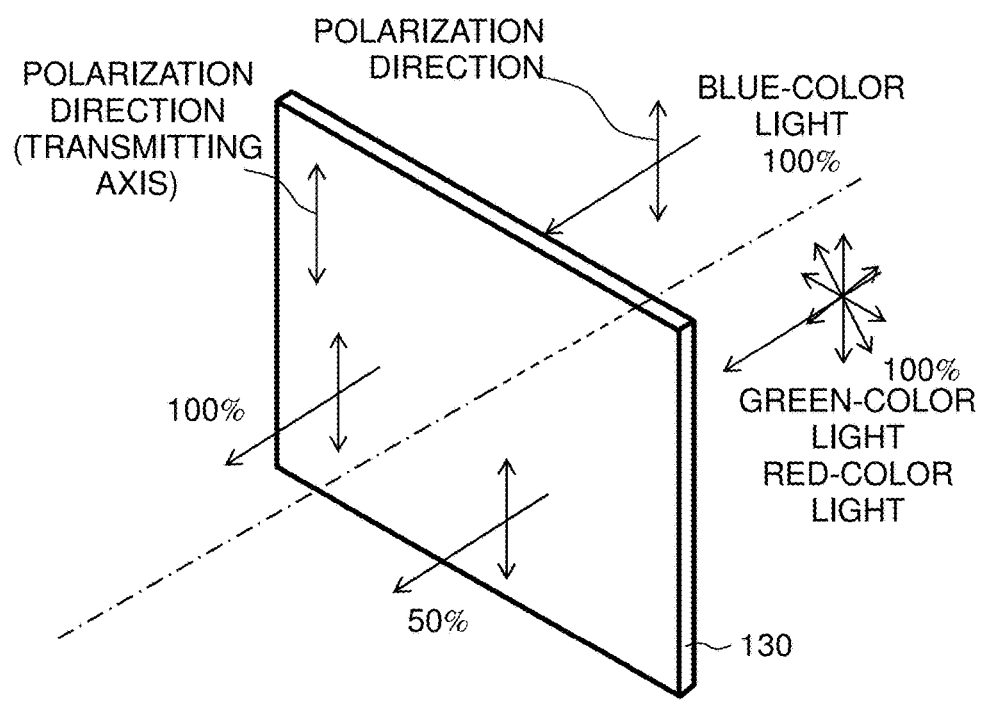
FIG. 5 is a diagram describing the light utilization efficiency where just a polarizing plate is used.
Figure 6:
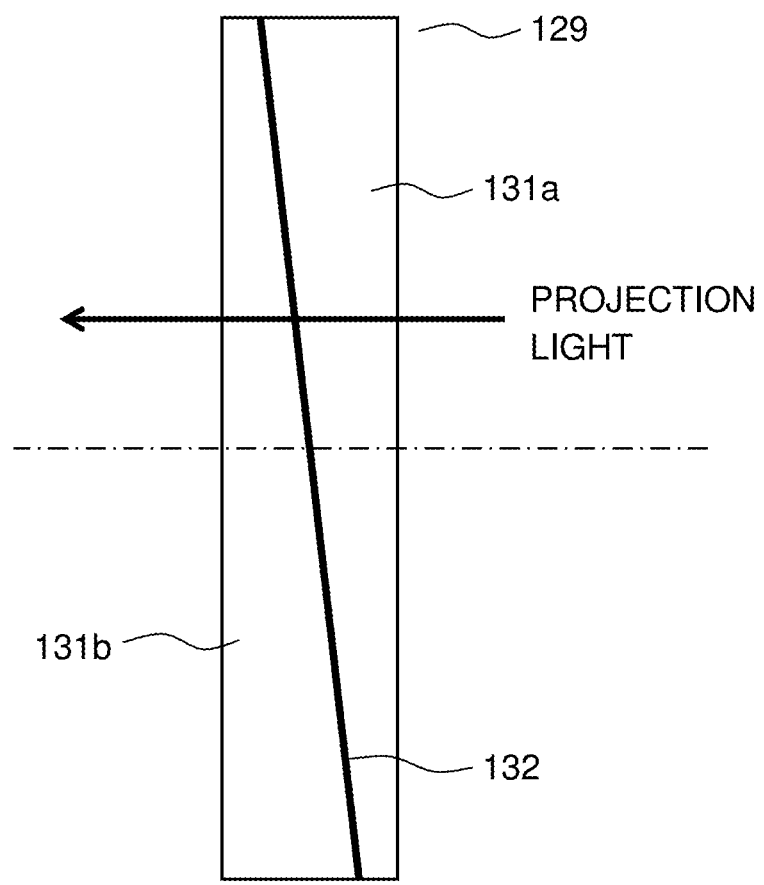
FIG. 6 is a side view of a depolarizing plate.
Figure 7:
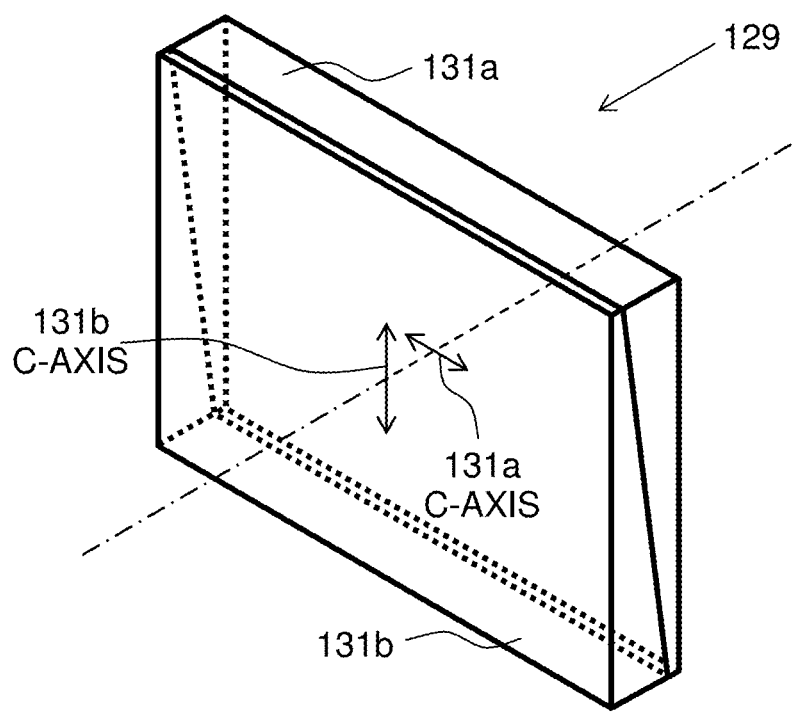
FIG. 7 is a perspective view of the depolarizing plate.
Figure 8:
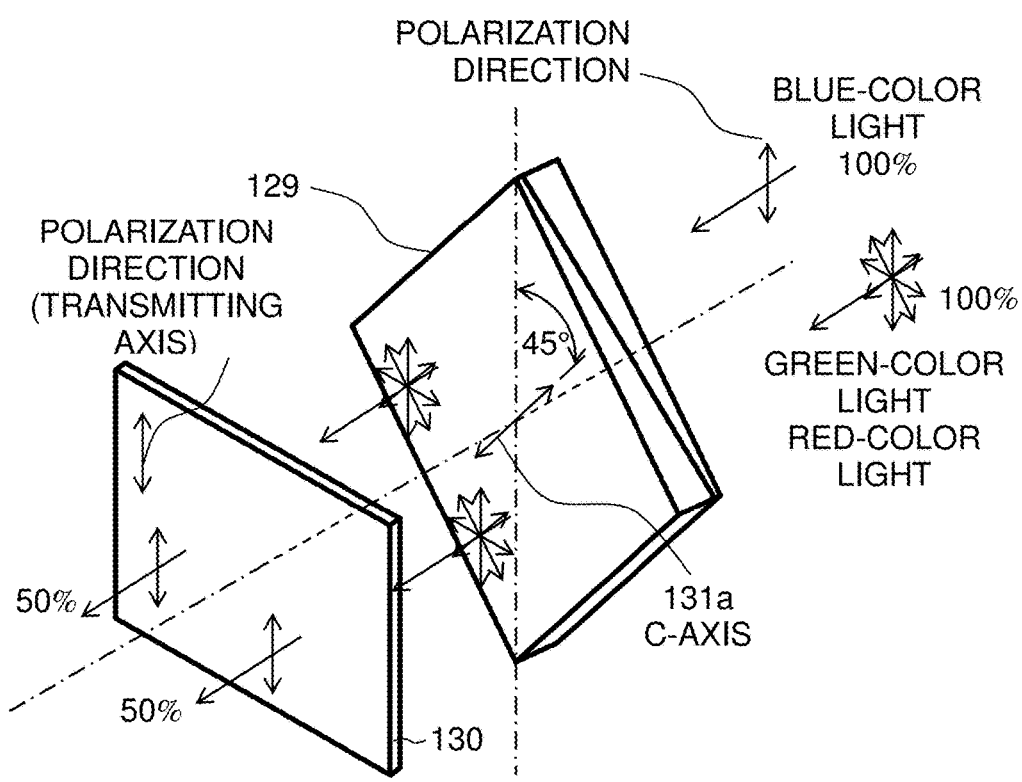
FIG. 8 is a diagram describing the light utilization efficiency where the polarizing plate and the depolarizing plate are used.

FIG. 1 is a diagram showing the structure of a stereoscopic image system using polarization according to an exemplary embodiment. The stereoscopic image system includes, as each of projection-type image display apparatus 10a and projection-type image display apparatus 10b, projection-type image display apparatus 100. FIG. 2 is a diagram showing the structure of the stereoscopic image projection-type display apparatus using polarization according to the exemplary embodiment. FIG. 3 is a diagram describing the state where color variations occur in a projected image. FIG. 4 is a plan view showing the front side of a fluorescent substance wheel apparatus used in projection-type image display apparatus 100. FIG. 5 is a diagram describing the light utilization efficiency where just a polarizing plate is used. FIG. 6 is a side view of a depolarizing plate. FIG. 7 is a perspective view of the depolarizing plate. FIG. 8 is a diagram describing the light utilization efficiency where the polarizing plate and the depolarizing plate are used.

Blue-color light output in −Y direction in FIG. 2 from blue-color laser diodes 101a, 101b, 101c used as the light source of excitation light is collimated by collimating lenses 102a, 102b, 102c. The collimated blue-color light is converged by lens 103 and lens 104 structuring an afocal system, and input to diffusing plate 105. The blue-color laser light input to diffusing plate 105 is diffused by diffusing plate 105, and input to dichroic mirror 106.

Dichroic mirror 106 has a feature that dichroic mirror 106 transmits blue-color light and reflects red-color light and green-color light. Dichroic mirror 106 is disposed so as to be inclined by 45 degrees relative to the optical axis. The blue-color light input from diffusing plate 105 to dichroic mirror 106 passes through dichroic mirror 106, first lens 107, and second lens 108, and irradiates fluorescent substances 111, 112 that are annularly formed on substrate 110 of fluorescent substance wheel apparatus 109.

Substrate 110 of fluorescent substance wheel apparatus 109 is driven to rotate by motor 113. Substrate 110 being rotating permits allocation of greater area for the fluorescent substances relating to fluorescence emission despite high energy of blue-color light with which fluorescent substance wheel apparatus 109 is irradiated. Accordingly, heat generation per unit area during fluorescence emission advantageously reduces. Here, fluorescent substance 111 is a fluorescent substance that has characteristics of emitting green-color fluorescent light in response to blue-color light as excitation light. Fluorescent substance 112 is a fluorescent substance that has characteristics of emitting red-color fluorescent light in response to blue-color light as excitation light. Green-color light and red-color light emitted from fluorescent substance 111 and fluorescent substance 112 are output in +Y direction in FIG. 2. The green-color light and the red-color light being fluorescent light from respective fluorescent substances are again input to dichroic mirror 106. Since dichroic mirror 106 has the characteristics of reflecting green-color light and red-color light, the green-color light and the red-color light are reflected by dichroic mirror 106, and propagate in +X direction in FIG. 2. Yellow-color light (combined light of green-color light and red-color light) input to lens 114 is condensed to the input surface of rod integrator 115 which is disposed in the forward direction and has a quadrangular opening.

Blue-color light output in +X direction from blue-color laser diodes 116a, 116b used as blue-color light sources is collimated by collimating lenses 117a, 117b. The collimated blue-color light is condensed by lens 118. At the position where the blue-color light is condensed by lens 118, diffusing plate 119 is disposed. The blue-color light diffused thereby becomes substantially parallel light at lens 120. The light output from lens 120 is input to dichroic mirror 106. Blue-color light input to dichroic mirror 106 transmits through dichroic mirror 106, and condensed by lens 114 to the input surface of rod integrator 115.

Thus, the blue-color light output in +X direction from blue-color laser diodes 116a, 116b being the blue-color light sources is output from fluorescent substance 111 and fluorescent substance 112, and combined with the green-color light and the red-color light reflected in +X direction by dichroic mirror 106, thereby becoming white-color light. Thus, white-color light is condensed at the input surface of rod integrator 115.

The fluorescent substance wheel apparatus and the blue-color laser diodes being the excitation light sources structure an excitation light source apparatus. Further, lens 103, 104, diffusing plate 105, lens 107, lens 108, and dichroic mirror 106 structure an excitation optical system that condenses light from the excitation light source apparatus. As shown in FIG. 4, on an identical radius of substrate 110 of the fluorescent substance wheel apparatus, fluorescent substance 111, fluorescent substance 112, and non-fluorescent substance formed part 121 are disposed.

In this manner, white color light is generated with the blue-color laser diodes. Note that, green-color light and red-color light are emitted sequentially. At the timing where non-fluorescent substance formed part 121 is irradiated with excitation light, blue-color laser diodes 101a, 101b, 101c as the light sources of excitation light are turned off, and blue-color laser diodes 116a, 116b as the light sources of blue-color light are turned on. At the timing where excitation light is input to fluorescent substance 111 or fluorescent substance 112, blue-color laser diodes 116a, 116b as the light sources of blue-color light are turned off, and blue-color laser diodes 101a, 101b, 101c as the light sources of excitation light are turned on. Thus, blue-color light, green-color light, and red-color light are output in order from the output surface of rod integrator 115. That is, white-color light passing through rod integrator 115 is formed by time-divisional blue-color light, green-color light, and red-color light.

The light output from rod integrator 115 transmits through lens 122 and lens 123, and reflected by mirrors 124, 125, thereby input to DMD (Digital Mirror Device) 126. DMD 126 modulates the input light by an image signal, thereby generating image light. That is, DMD 126 is an imaging element that is controllable by a signal from an external source.

The image light generated by DMD 126 is output in +Y direction, and enlarged and projected on a not-shown screen by projection lens 127 structuring an enlarge-projection system. The screen is a silver screen which maintains polarization of the input light. Near the output surface side of projection lens 127, depolarizing plate 129 is disposed. Further, on the output side of depolarizing plate 129, polarizing plate 130 is disposed. That is, depolarizing plate 129 is disposed on the optical path between projection lens 127 and polarizing plate 130. Note that, the optical axis, which extends from DMD 126 to projection lens 127, and mirror 125 are disposed at positions spatially displaced from each other.

In general, the output light of a laser diode is polarized. Further, blue-color laser diodes 116a, 116b are disposed so that polarization directions of their respective output blue-color light beams are identically oriented. On the other hand, the fluorescence output from a fluorescent substance is not polarized. Accordingly, out of the light beams output from projection lens 127, blue-color light is polarized and green-color light and red-color light are not polarized.

Here, a description will be given of the case where depolarizing plate 129 is not provided on the output surface side of projection lens 127 and just polarizing plate 130 is disposed. As shown in FIG. 5, when the polarization direction of blue-color light and the polarizing axis of polarizing plate 130 match with each other, the blue-color light is transmitted by 100% (absorption by the polarizing plate is not considered herein). On the other hand, green-color light and red-color light not being polarized pass through polarizing plate 130 by 50%, and the remaining 50% is absorbed by polarizing plate 130. This intensifies the blue-color light as compared to the green-color light and the red-color light. As a result, an image with poor white balance is projected. Note that, when the polarization direction of blue-color light and the polarizing axis of the polarizing plate are orthogonal to each other, the blue-color light is absorbed by the polarizing plate 130.

Practically, while polarized blue-color light passes through the optical systems, the polarization characteristics of the blue-color light changes. Since such changes in polarization characteristics differ depending on the path of the blue-color light, the blue-color light output from projection lens 127 has different polarization characteristics depending on the output direction. Accordingly, since the polarization characteristics of blue-color light input to polarizing plate 130 cannot maintain evenness as a whole, variations as shown in FIG. 3 occur in an image projected on screen 18. Note that, in FIG. 3, the shaded portions represent yellowish portions, and the rest represents bluish white portion.

In the present exemplary embodiment, depolarizing plate 129 is disposed on the output side of projection lens 127. As shown in FIG. 6, depolarizing plate 129 is made up of prism 131a and prism 131b. Prism 131a is made of birefringent optical quartz with thickness distribution. Prism 131b is fixed as being opposed to prism 131a, so that the input surface and the output surface of depolarizing plate 129 become parallel to each other. The wedge surface of prism 131a and the wedge surface of prism 131b are bonded to each other with bonding layer 132 so as to oppose to each other. Bonding layer 132 is ultraviolet curing resin (UV resin) or the like.

Here, the thickness of prism 131a and that of prism 131b have a certain inclination. Further, as shown in FIG. 7, as to the crystallographic axis of prism 131a and the crystallographic axis of prism 131b, respective C-axes are orthogonal to each other in the state where prism 131a and prism 131b are bonded to each other. When polarized light having a polarizing axis inclined by 45 degrees relative to the crystallographic axis of prism 131a is input, output light with substantially random polarization characteristics is output from the output surface of prism 131a. When the polarizing axis of the input light is not inclined by 45 degrees relative to the crystallographic axis, the light may not be fully depolarized. Setting the crystallographic axis of prism 131b in the direction orthogonal to the crystallographic axis of prism 131a reduces dependence of the polarizing axis of the input light on the angle and facilitates depolarization.

Prism 131a and prism 131b are desirably made of an identical material. Use of an identical material provides a substantially constant optical length from a point input to prism 131a to a point output from prism 131b within a plane orthogonal to the optical axis. This allows suppressing influence on a projected image with compensation for optical characteristics error caused by depolarization. Note that, desirably the input surface and the output surface of depolarizing plate 129 are provided with anti-reflection coating.

With reference to FIG. 8, a description will be given of the light utilization efficiency where the polarizing plate and the depolarizing plate are used. Depolarizing plate 129 is disposed so that the C-axis direction of prism 131a and the polarization direction of blue-color light are different from each other by 45 degrees. Blue-color light is depolarized by depolarizing plate 129. Green-color light and red-color light are originally not polarized. Accordingly, the transmission rate of polarizing plate 130 is 50% for each of blue-color light, green-color light, and red-color light irrespective of the direction of the polarizing axis of polarizing plate 130. Thus, a high-quality image can be obtained with light having passed through the polarizing plate without impairing white balance.

In the present exemplary embodiment, depolarizing plate 129 is disposed such that its C-axis forms an angle of 45 degrees relative to the polarizing axis of blue-color light output from projection lens 127.

Here, the prism (a wedge substrate) structuring depolarizing plate 129 has been described as quartz. When at least one of the prisms is quartz, the other may be a transparent optical glass material. With other material also, the effect of a certain level can be exhibited, and a further reduction in costs can be achieved.

On the other hand, the quartz forming the depolarizing plate is birefringent. When the ordinary ray and the extraordinary ray are largely separated, a projected image may be influenced thereby. Accordingly, desirably the wedge angle of prisms 131a, 131b is one degree or smaller. In particular, in order to achieve both the depolarizing performance and the focusing performance, the wedge angle of prisms 131a, 131b is more desirably about 30 minutes (0.5 degrees).

Here, it has been described that blue-color laser diodes 116a, 116b are disposed so that their polarization directions are identically oriented. However, from the foregoing description, it is clear that blue-color laser diodes 116a, 116b can be disposed so that their polarization directions are orthogonal to each other without any problems.

Further, in the exemplary embodiment, blue-color laser diodes 116a, 116b are provided as light sources of blue-color light. On the other hand, part of blue-color light for excitation output from blue-color laser diodes 101a, 101b, 101c being the light sources of excitation light may be separated so as to serve as the blue-color light. In this case, blue-color laser diodes 116a, 116b for light sources of blue-color light can be dispensed with.

In the structure of FIG. 2, depolarizing plate 129 and polarizing plate 130 are disposed on the output side of projection lens 127. Thus, while depolarizing plate 129 and polarizing plate 130 become unnecessary when a stereoscopic image is not projected, the rest of the optical system up to projection lens 127 can be used as it is. In other words, by adding depolarizing plate 129 and polarizing plate 130 to a projection-type image display apparatus not provided with depolarizing plate 129 and polarizing plate 130 as the necessity of projecting a stereoscopic image arises, a projection-type image display apparatus that projects a stereoscopic image using polarization can be structured. Thus, most of the structure of the projection-type image display apparatus can be uniform irrespective of the function of projecting a stereoscopic image, whereby a reduction in costs can be achieved.

Figure 9:
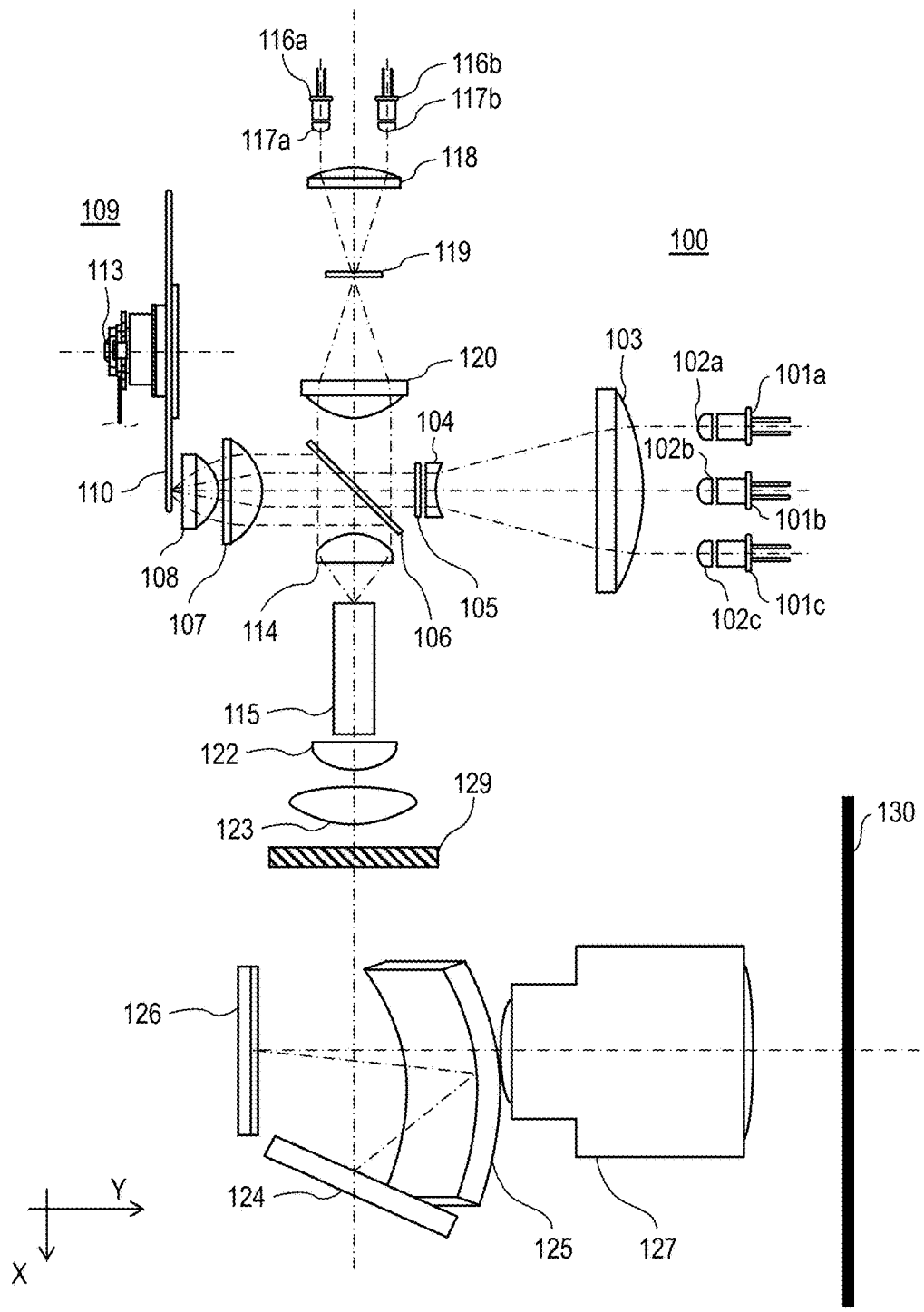
FIG. 9 shows a layout where the depolarizing plate is incorporated.

On the other hand, when higher priority is assigned to a reduction in size and simplification of the projection-type image display apparatus that projects a stereoscopic image using polarization than the above-described advantage, it is also effective to employ the structure shown in FIG. 9. In the projection-type image display apparatus shown in FIG. 9, depolarizing plate 129 is disposed on the optical path on the input surface side of projection lens 127. When depolarizing plate 129 is disposed at a position where light is condensed in a small area, depolarizing plate 129 may be disadvantageously heated by light transmitting through depolarizing plate 129. Accordingly, desirably depolarizing plate 129 is disposed at any point from the output surface of rod integrator 115 to the input surface of DMD 126. Here, depolarizing plate 129 is disposed on the output surface side of lens 123 of a relay optical system. Disposing depolarizing plate 129 on the output surface side of lens 123 realizes depolarization while reducing heating per unit area of depolarizing plate 129. Further, in the structure in which mirror 124 and mirror 125 increase in-plane variations of the polarization characteristics, depolarizing plate 129 can achieve further uniform depolarization before light is input to mirror 124.

Figure 10:
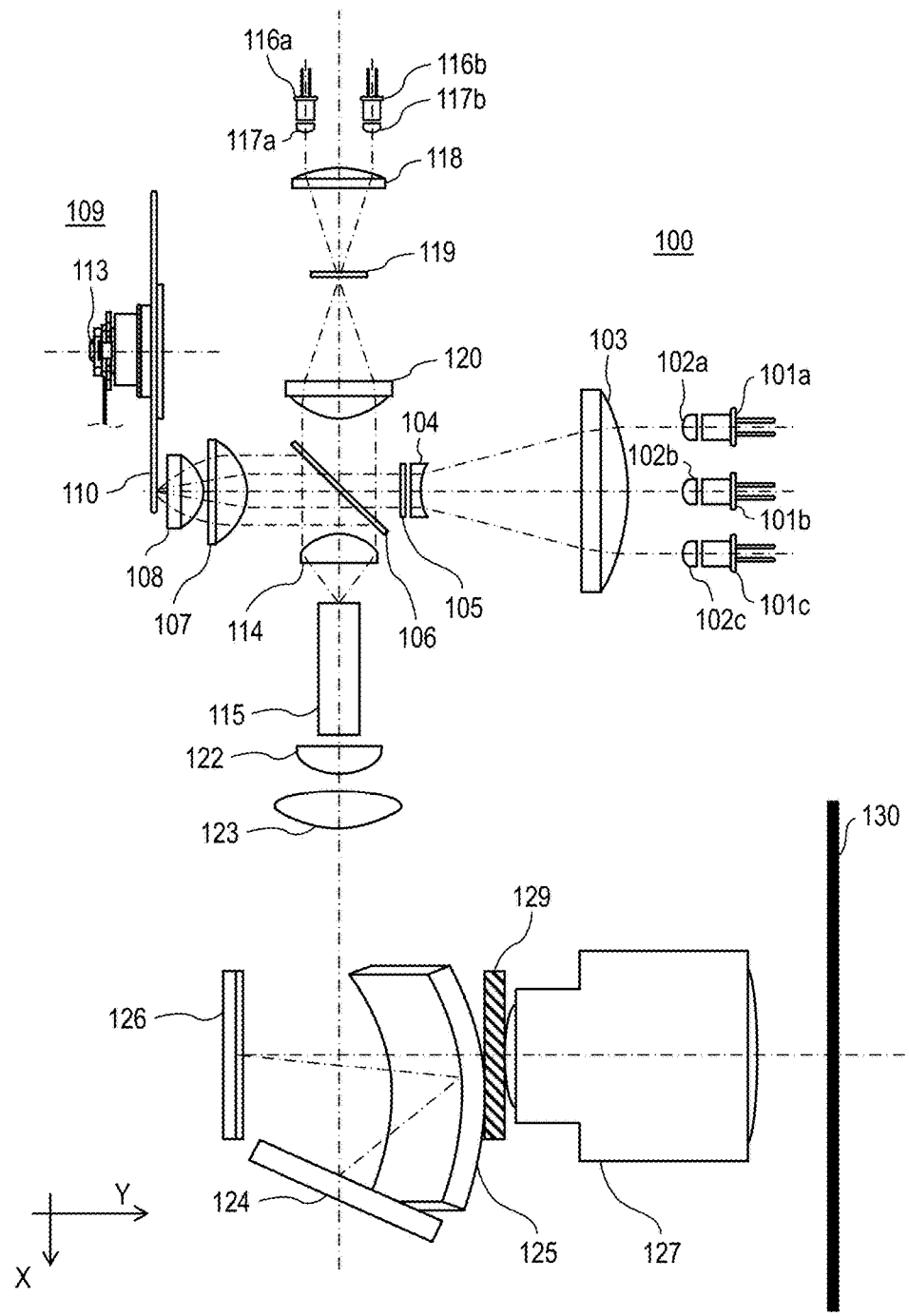
FIG. 10 shows other layout where the depolarizing plate is incorporated.

Further, FIG. 10 shows other structure in which depolarizing plate 129 is disposed inside the projection-type image display apparatus. Depolarizing plate 129 is disposed near the input surface of the projection lens. This realizes a reduction in size of depolarizing plate 129. In particular, when depolarizing plate 129 is attachable to the projection lens, depolarizing plate 129 can automatically follow a shifting operation of the projection lens when the projection lens has the shifting function. Further, when the projection lens is of the interchangeable lens type in which the projection lens is removably attached to the body of the projection-type image display apparatus, an interchangeable lens with depolarizing plate 129 and an interchangeable lens without depolarizing plate 129 can be selectively used in accordance with the purpose. Thus, an interchangeable lens without a relatively expensive depolarizing plate can be used when stereoscopic projection is not necessary, and therefore the cost can be reduced. Here, desirably depolarizing plate 129 is minutely adjustable in the rotation direction relative to projection lens 127. Further, in order to perform fixing after adjusting the angle of depolarizing plate 129 and projection lens 127, desirably depolarizing plate 129 is fixable to projection lens 127.

As has been described above, when a polarized light source is used, by disposing a depolarizing plate to depolarize the entire visible light region, a stereoscopic image system of high image quality can be implemented. What has been shown in the present exemplary embodiment is the one-chip structure in which color display is performed using one DMD and switching colors at high speeds. However, a structure in which a DMD is provided for each color may be employed. Specifically, it is also possible to employ the three-chip structure in which three DMDs respectively corresponding to blue-color light, green-color light, and red-color light are used. It goes without saying that, in the three-chip structure also, disposing depolarizing plate 129 can exhibit the similar effect.

Further, as other one-chip structure, a through hole may be provided to non-fluorescent substance formed part 121 of substrate 110 of fluorescent substance wheel apparatus 109. Thus, structuring an optical system for blue-color light which combines blue-color light having passed through the through hole with green-color light and red-color light can eliminate blue-color laser diodes 116a, 116b. It goes without saying that, with this structure also, disposing depolarizing plate 129 is effective. Here, depolarizing plate 129 may be provided in the middle of the optical system for blue-color light.

In the foregoing, the exemplary embodiment has been described as an illustration of the technique disclosed in the present application. However, the technique of the present disclosure is not limited to such an exemplary embodiment, and applicable to an exemplary embodiment with changes, replacement, addition, omission or the like. Further, a new exemplary embodiment may be made by combining the structure elements described in the above-described exemplary embodiment.

In the foregoing, while the image display element is a DMD, the technique is also applicable to a liquid crystal scheme projector in which a liquid crystal panel is disposed in the optical path of each color-light. However, the light utilization efficiency of the liquid crystal panel can be more improved when the input light input to the liquid crystal panel is polarized light. That is, the structure in which depolarizing plate 129 is provided on the optical path on the output surface side of the liquid crystal panel is more effective.

Figure 11:
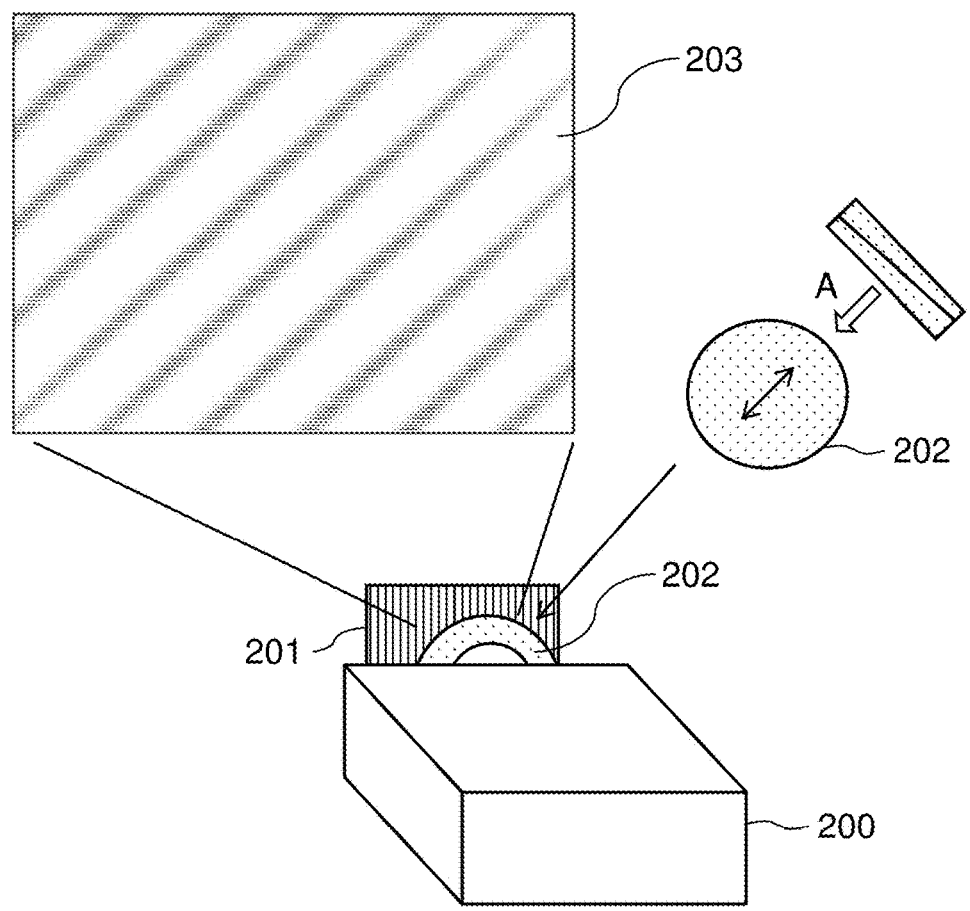
FIG. 11 is a diagram showing the state of first color variations where the depolarizing plate is provided.

As described above, use of depolarizing plate 129 improves the quality of an image. On the other hand, with a depolarizing plate, color variations may occur in the direction corresponding to the inclination direction of the wedge substrate of the depolarizing plate. FIG. 11 shows color variations (first color variations) in an image projected by projection-type image display apparatus 200 including depolarizing plate 202 on the input surface side of polarizing plate 201. Note that, the outer shape of depolarizing plate 202 is circular. The first color variations are bands diagonally rising from bottom left to top right on screen 203, and visually recognized as periodic pale yellow. The direction of band-like color variations appearing on screen 203 match with the inclination direction of the wedge substrates of depolarizing plate 202.

Figure 12:
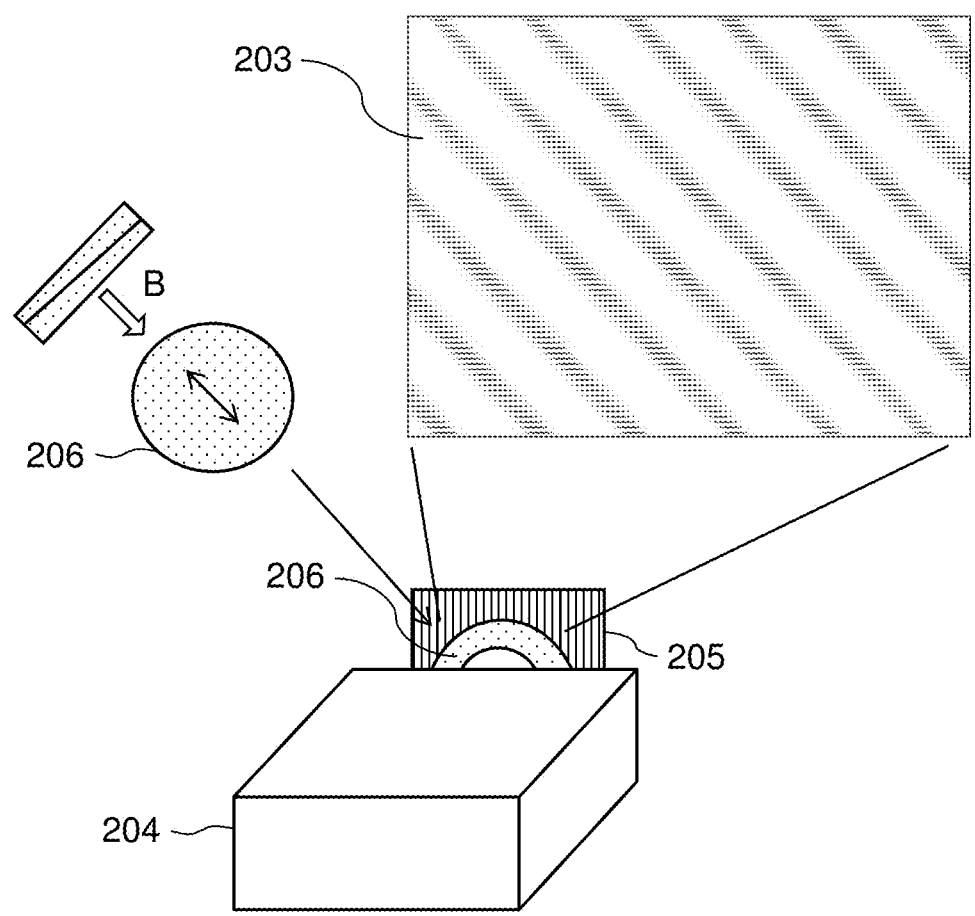
FIG. 12 is a diagram showing the state of second color variations where the depolarizing plate is provided.

Projection-type image display apparatus 204 shown in FIG. 12 includes depolarizing plate 206. Depolarizing plate 206 is an element identical to depolarizing plate 202, except that depolarizing plate 206 is rotated by 90 degrees and attached. Thus, color variations (second color variations) in an image projected by projection-type image display apparatus 204 diagonally lower from top left to bottom right on screen 203.

Figure 13:
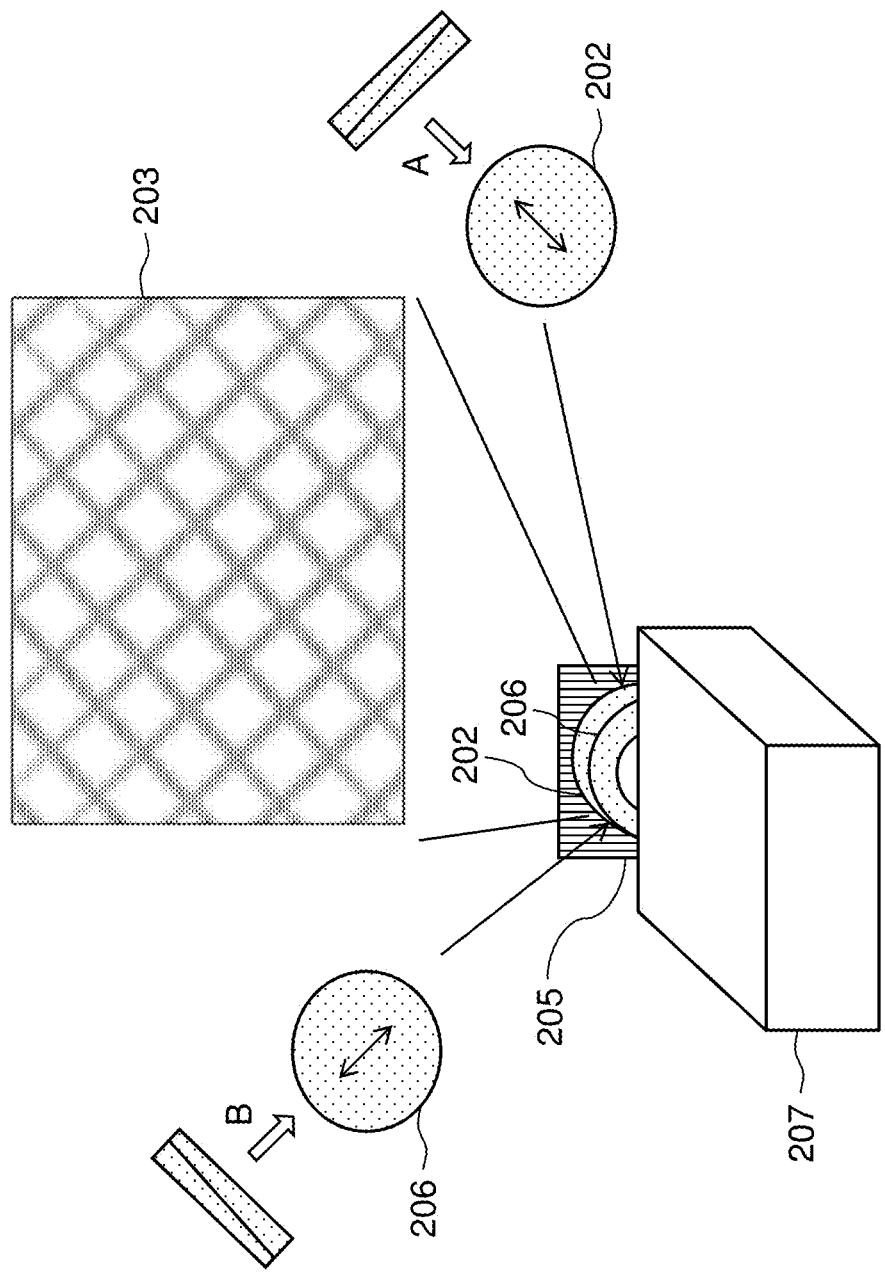
FIG. 13 is a diagram showing the state of color variations where double depolarizing plates are provided.

Projection-type image display apparatus 207 shown in FIG. 13 includes two depolarizing plates 202, 206. Depolarizing plate 202 and depolarizing plate 206 are disposed so that the inclination directions of their respective wedge substrates become orthogonal to each other. Thus, a pattern in which the first color variations and the second color variations are superimposed on each other is projected on screen 203. Here, the pattern of superimposed color variations is less prone to be recognized as compared to the band-like color variations. Further, except for the portion where the first color variations and the second color variations are constructively superimposed on each other, yellow bands and relatively bluish portions are destructively superimposed on each other, color variations are further less prone to be visually recognized. Thus, degradation in image quality due to color variations can be suppressed.

Figure 14:
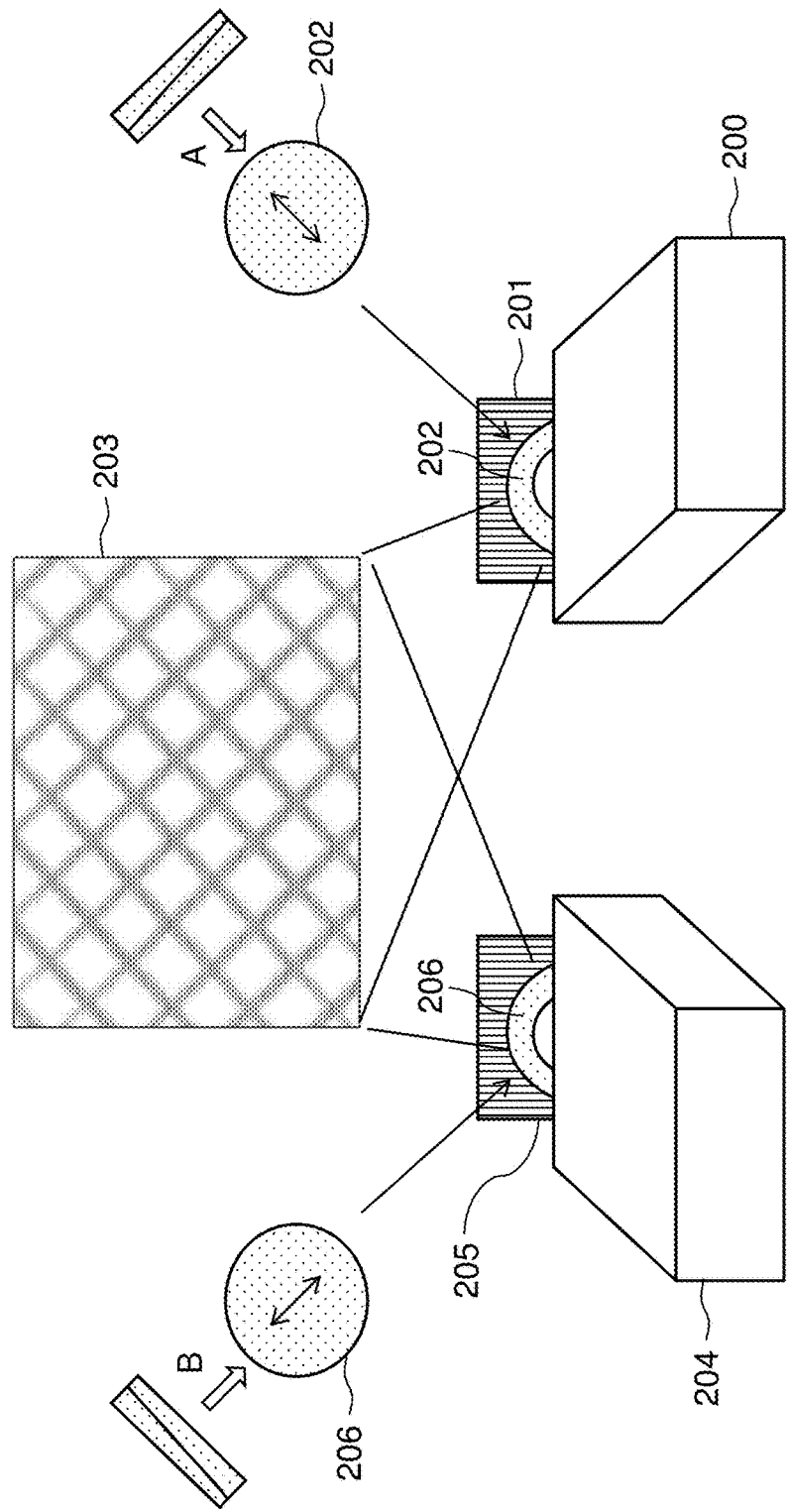
FIG. 14 is a diagram showing the state of color variations with the stereoscopic image system in improved installation conditions for the depolarizing plates.
Figure 15:
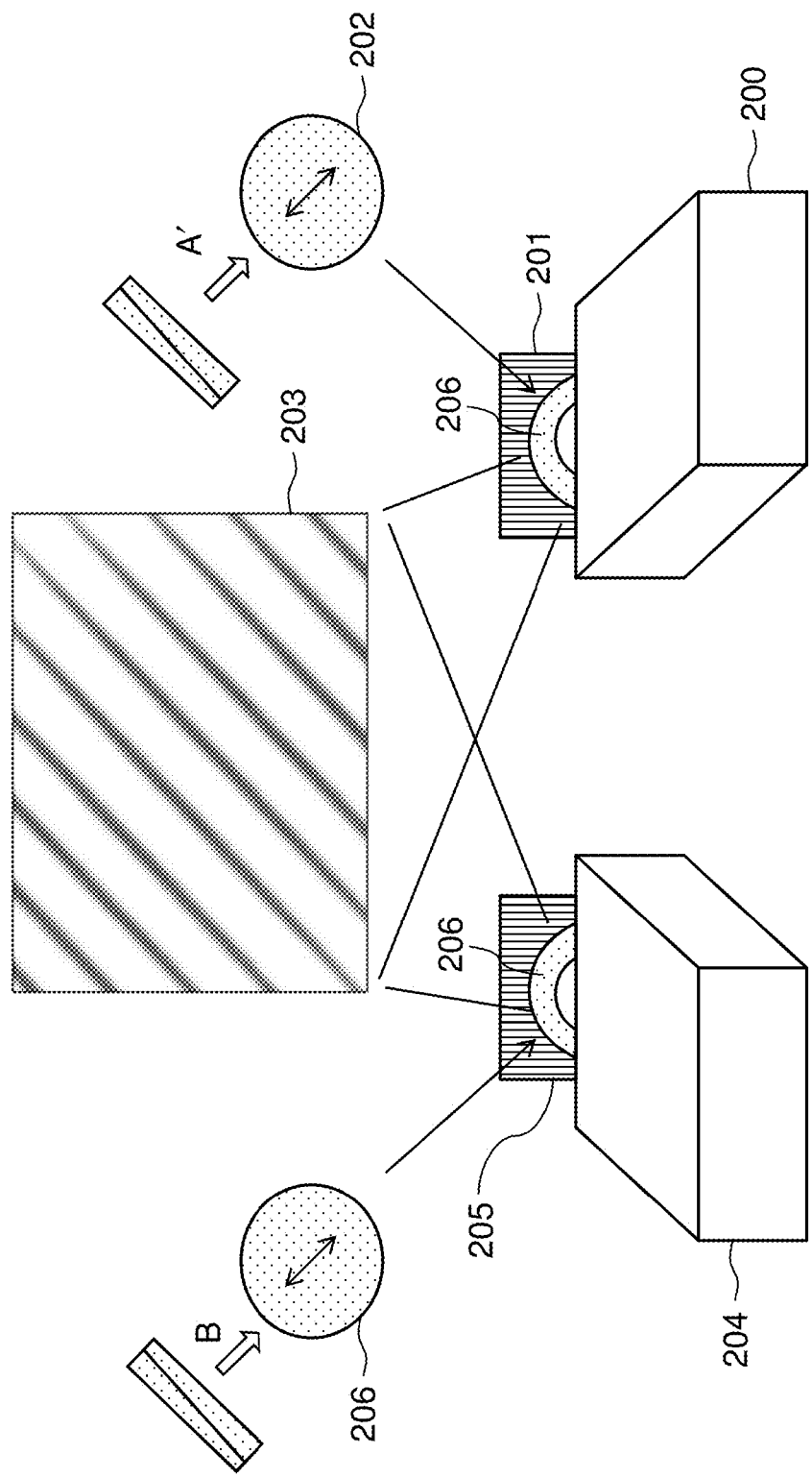
FIG. 15 is a diagram showing the state of color variations with the stereoscopic image system before the improvement in installation conditions for the depolarizing plates.

A projection-type image display apparatus shown in FIG. 14 includes a first projection-type image display apparatus and a second projection-type image display apparatus. The first projection-type image display apparatus is projection-type image display apparatus 200 shown in FIG. 11. The second projection-type image display apparatus is projection-type image display apparatus 204 shown in FIG. 12. An image projected by the first projection-type image display apparatus and an image projected by the second projection-type image display apparatus are superimposed on each other on screen 203. The inclination direction of the wedge substrates of the depolarizing plate included in the first projection-type image display apparatus and the inclination direction of the wedge substrates of the depolarizing plate included in the second projection-type image display apparatus are orthogonal to each other. Screen 203 in FIG. 15 shows the state of color variations in this case. This structure exhibits the effect similar to that of the structure shown in FIG. 13.

FIG. 15 shows the case in which the inclination directions of the wedge substrates of two depolarizing plates are identical to each other in the structure of the projection-type image display apparatus shown in FIG. 14. In the case where projection is performed so that color variations in an image projected by the first projection-type image display apparatus and color variations in an image projected by the second projection-type image display apparatus are superimposed on each other, color variations in a pattern which is easily visually recognized by the viewer occur. In order to avoid such a degradation in image quality due to color variations, the inclination directions of the wedge substrates of the depolarizing plates are desirably adjustable.

Note that, in the structures shown in FIGS. 11 to 14, the depolarizing plate is disposed between the projection lens and the polarizing plate. However, it goes without saying that the present disclosure is applicable to the case where the depolarizing plate is disposed between the output side of the integrator element and the image display element, or between the projection lens and the image display element.

The present disclosure is applicable to a stereoscopic image projection-type display apparatus using polarization.

What is claimed is:

1. A projection-type image display apparatus comprising:
    a fluorescent substance that has characteristics of emitting predetermined fluorescence in response to excitation light;
    an excitation light source apparatus that has a semiconductor laser that outputs laser light of a wavelength with which the fluorescent substance is excited;
    an excitation optical system that condenses the light from the excitation light source apparatus;
    an image display element that is controllable by a signal from an external source;
    a projection optical system that is capable of enlarging and projecting an image on the image display element;
    a polarizing plate that is disposed on an output side of the projection optical system; and
    a depolarizing plate having a crystallographic axis that is placed on the optical path between the polarizing plate and the excitation light source apparatus.

2. The projection-type image display apparatus according to claim 1, wherein polarized light is included in an entire or part of a wavelength range of light input to the depolarizing plate having the crystallographic axis.

3. The projection-type image display apparatus according to claim 2, wherein the depolarizing plate having the crystallographic axis is disposed so that a C-axis of the depolarizing plate and a polarizing axis of the light input to the depolarizing plate form an angle of 45 degrees.

4. The projection-type image display apparatus according to claim 1, wherein the fluorescent substance has characteristics of emitting one of green-color light, red-color light, and yellow-color light in response to excitation light.

5. The projection-type image display apparatus according to claim 1, wherein a plurality of the semiconductor lasers respectively output blue-color light beams, the semiconductor lasers being disposed so that polarization directions of the output light beams are identical to each other or orthogonal to each other.

6. The projection-type image display apparatus according to claim 1, wherein
    the depolarizing plate having the crystallographic axis is made up of two wedge substrates,
    at least one of the wedge substrates is made of quartz,
    the wedge substrates are bonded to each other having respective wedge surfaces of the wedge substrates rotated by 180 degrees relative to each other and opposed to each other, and
    an input surface and an output surface of the depolarizing plate having the crystallographic axis are in parallel to each other.

7. The projection-type image display apparatus according to claim 6, wherein
    the two wedge substrates of the depolarizing plate having the crystallographic axis are made of quartz, and
    the two wedge substrates are disposed so that their respective C-axes of the two wedge substrates are orthogonal to each other.

8. The projection-type image display apparatus according to claim 6, wherein a wedge angle of each of the wedge substrates forming the depolarizing plate having the crystallographic axis is less than one degree.

9. The projection-type image display apparatus according to claim 6, wherein a wedge angle of each of the wedge substrates forming the depolarizing plate having the crystallographic axis is about 0.5 degrees.

10. The projection-type image display apparatus according to claim 1, wherein the depolarizing plate having the crystallographic axis is disposed on an optical path between the projection optical system and the polarizing plate.

11. The projection-type image display apparatus according to claim 1, further comprising an integrator element being an optical integration apparatus for uniformly illuminating the image display element, wherein the depolarizing plate having the crystallographic axis is disposed on an optical path between an output section of the integrator element and the image display element.

12. The projection-type image display apparatus according to claim 1, wherein the depolarizing plate having the crystallographic axis is disposed between the projection optical system and the image display element, and supported so as to be attachable to the projection optical system.

13. The projection-type image display apparatus according to claim 12, wherein the projection optical system is of an interchangeable lens scheme in which the projection optical system is removably attached to a body of the projection-type image display apparatus.

14. The projection-type image display apparatus according to claim 1, wherein
    the semiconductor laser outputs blue-color light,
    the fluorescent substance has characteristics of emitting yellow-color light in response to the blue-color light, and
    the depolarizing plate having the crystallographic axis is disposed so that C-axis of the depolarizing plate forms an angle of 45 degrees relative to a polarizing axis of the blue-color light from the semiconductor laser.

15. The projection-type image display apparatus according to claim 1, wherein
    the image display element is a DMD (digital mirror device) in which mirrors are two-dimensionally disposed, and
    respective inclination angles of the mirrors are controllable independently of each other.

16. The projection-type image display apparatus according to claim 1, wherein an image signal that modulates the image display element is an image for one of a right eye and a left eye differing in parallax from each other.

17. The projection-type image display apparatus according to claim 1, wherein
    two pieces of the depolarizing plates having crystallographic axis are disposed on an optical axis in order, and
    the depolarizing plates having the crystallographic axis are disposed so that inclination directions of their respective wedge substrates are substantially orthogonal to each other on a plane being perpendicular to an optical axis of projection light.

18. A projection-type image display apparatus comprising:
    a first projection-type image display apparatus; and
    a second projection-type image display apparatus, wherein
    the first projection-type image display apparatus and the second projection-type image display apparatus are each the projection-type image display apparatus according to claim 1,
    the first projection-type image display apparatus includes a first depolarizing plate having a crystallographic axis as the depolarizing plate and controls the image display element based on a right-eye image signal,
    the second projection-type image display apparatus includes a second depolarizing plate having a crystallographic axis as the depolarizing plate and controls the image display element based on a left-eye image signal, the right-eye image signal and the left-eye image signal are image signals corresponding to a pair of images with parallax, and the first depolarizing plate and the second depolarizing plate are disposed so that inclination directions of respective wedge substrates of the first depolarizing plate and the second depolarizing plate are substantially orthogonal to each other on a plane being perpendicular to an optical axis of projection light.

19. The projection-type image display apparatus according to claim 1, wherein the depolarizing plate is disposed so that a C-axis of the depolarizing plate and a polarizing axis of blue light input to the depolarizing plate form an angle of 45 degrees.

* * * * *